(12) United States Patent
Beranger et al.

(10) Patent No.: US 12,280,386 B2
(45) Date of Patent: Apr. 22, 2025

(54) FLUID PRODUCT DISPENSER

(71) Applicant: APTAR FRANCE SAS, Le Neubourg (FR)

(72) Inventors: Stéphane Beranger, Surtauville (FR); Alex Milian, Les Baux de Breteuil (FR)

(73) Assignee: APTAR FRANCE SAS, Le Neubourg (FR)

( * ) Notice: Subject to any disclaimer, the term of this patent is extended or adjusted under 35 U.S.C. 154(b) by 251 days.

(21) Appl. No.: 17/917,117

(22) PCT Filed: Apr. 6, 2021

(86) PCT No.: PCT/FR2021/050594
§ 371 (c)(1),
(2) Date: Oct. 5, 2022

(87) PCT Pub. No.: WO2021/205106
PCT Pub. Date: Oct. 14, 2021

(65) Prior Publication Data
US 2023/0149960 A1 May 18, 2023

(30) Foreign Application Priority Data
Apr. 7, 2020 (FR) ...................................... 2003465

(51) Int. Cl.
*B05B 11/10* (2023.01)
*B65D 41/04* (2006.01)

(52) U.S. Cl.
CPC ...... *B05B 11/1049* (2023.01); *B65D 41/0471* (2013.01)

(58) Field of Classification Search
CPC .............. B05B 11/049; B05B 11/1049; B65D 41/0471; F16B 33/006; F16B 29/00
See application file for complete search history.

(56) References Cited

U.S. PATENT DOCUMENTS 4,781,311 A * 11/1988 Dunning ............ B65D 41/0471
    215/318
5,169,033 A * 12/1992 Shay .................. B05B 11/1045
    222/153.09

(Continued)

FOREIGN PATENT DOCUMENTS

DE    10 2011 015 004 A1    9/2012
WO      2009/150351 A1    12/2009

OTHER PUBLICATIONS

International Search Report for PCT/FR2021/050594 dated Jul. 8, 2021.

(Continued)

*Primary Examiner* — Bob Zadeh
(74) *Attorney, Agent, or Firm* — Sughrue Mion, PLLC

(57) ABSTRACT

A fluid product dispenser having a vessel and provided with a neck forming at least one helical thread, and a dispensing head mounted on the neck of the vessel, the head having a dispensing member and a fastening member engaging both with the threaded neck and the dispensing member The fastening member has a deformable and malleable skirt intended to engage with the threaded neck, and a rigid collar engaged around the skirt to push the skirt radially against the threaded neck in such a way as to deform the skirt against the thread so as to create a thread imprint in the skirt. The helical thread has an intermediate portion that has, on at least some of its length, a cross-section that decreases in the unscrewing direction and increases in the screwing direction, such that the unscrewing torque decreases and the rescrewing torque increases.

18 Claims, 7 Drawing Sheets

(56) References Cited

U.S. PATENT DOCUMENTS

| | | | | |
|---|---|---|---|---|
| 5,398,830 A | * | 3/1995 | de Pous | B65D 41/0471 215/47 |
| 5,676,270 A | * | 10/1997 | Roberts | B65D 41/0471 220/289 |
| 5,713,479 A | * | 2/1998 | Brady | B65D 41/0471 215/44 |
| 2009/0283549 A1 | * | 11/2009 | Beranger | B05B 11/001 222/321.7 |
| 2011/0204099 A1 | * | 8/2011 | Piscopo | B65D 47/32 141/381 |
| 2023/0149960 A1 | * | 5/2023 | Beranger | B65D 41/0471 222/153.01 |

OTHER PUBLICATIONS

International Preliminary Report on Patentability dated Feb. 15, 2022 in International Application No. PCT/FR2021/050594.

* cited by examiner

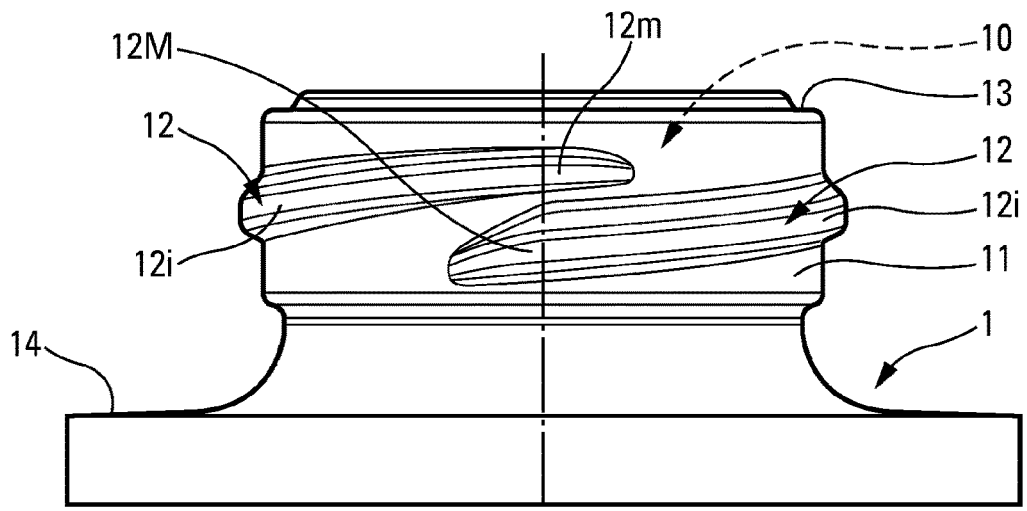
Fig. 5
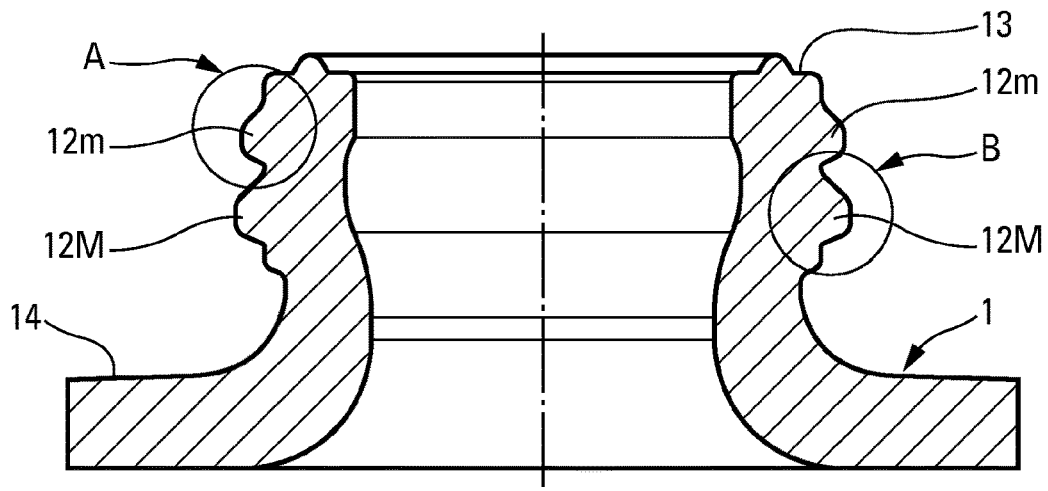
Fig. 6
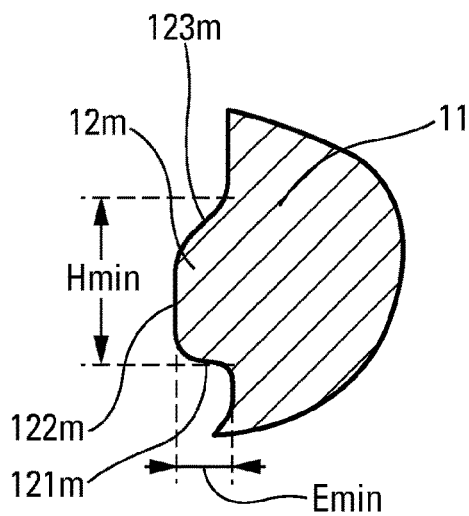 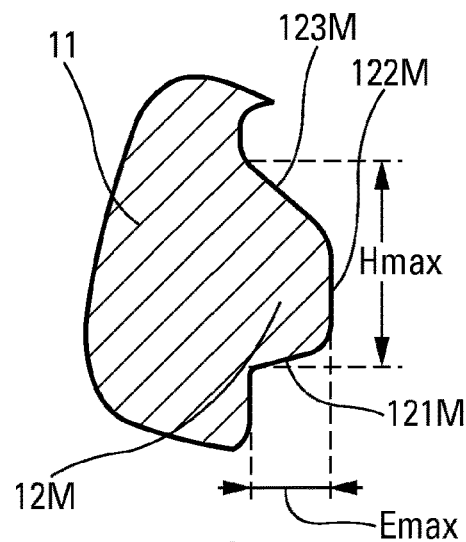
Fig. 7a  Fig. 7b

FLUID PRODUCT DISPENSER

CROSS REFERENCE TO RELATED APPLICATIONS

This application is a National Stage of International Application No. PCT/FR2021/050594 filed Apr. 6, 2021, claiming priority based on French Patent Application No. 2003465 filed Apr. 7, 2020.

The present invention relates to a fluid product dispenser comprising a fluid product vessel provided with an externally threaded neck and internally defining an opening communicating with the inside of the vessel. The dispenser further comprises a dispensing head that is mounted on the neck of the vessel, the head comprising a dispensing member, such as a pump or a valve, a pusher for actuating the dispensing member and a fastening member engaging both with the threaded neck of the vessel and with the dispensing member. Such dispensers are frequently used in the fields of perfumery, cosmetics, or also pharmacy.

In the prior art, document WO 2009/150351 is known, which describes a dispenser comprising a vessel provided with a threaded neck and a fastening member comprising a deformable and malleable skirt intended to engage with the threaded neck, and a rigid collar engaged around the skirt to push the skirt radially against the threaded neck in such a way as to deform the skirt against the thread of the neck so as to create a thread imprint in the skirt. The skirt of the fastening member is thus brought into engagement with the threaded neck by an inwardly-directed radial movement, and not by an axial turning movement, as with conventional threaded skirts. Before the skirt is mounted for the first time on a threaded neck, the skirt does not include any thread imprint: it is only while radial thrust is being applied by means of the collar, that the thread imprint is created by plastic deformation of the deformable and malleable skirt. The material constituting the deformable and malleable skirt creeps plastically around the threads of the neck of the vessel in order to achieve a final state with a satisfactory thread imprint.

This dispenser of the prior art thus allows to mount the skirt around the neck without rotation and then allows to remove the skirt from the neck by simple unscrewing. This dispenser therefore meets a recycling requirement by allowing the separation of these constituent elements. However, it has been found empirically that it is not possible to rescrew the skirt onto the neck for several reasons. The first is that the contact between the skirt and the neck is extremely close and tight, such that there is absolutely no clearance. The second results from the skirt relaxes slightly when it is removed from the neck as a result of its malleability. The third reason is associated with the fact that the skirt is formed of flexible tabs that are separated by slots: when it is desired to rescrew the skirt, its tabs hook the thread of the neck and come across, thus making it impossible to rescrew. It is therefore not possible to reuse this dispenser, which does not meet the current requirement of durability.

An object of the present invention is to remedy the above-mentioned drawbacks of the prior art by defining a fluid product dispenser, the fastening member of which can be rescrewed onto the neck after unscrewing. The user should not have to make several attempts to engage the imprints of the skirt on the threads of the neck.

To do this, the present invention proposes that the helical thread(s) of the neck comprise(s) an upper screw start, a lower thread end and an intermediate portion that has a cross-section that decreases in the unscrewing direction and/or increases in the screwing direction, such that the unscrewing torque decreases and/or the rescrewing torque increases. Thus, the imprints of the skirt which first engage with the threads of the neck during rescrewing are greater than the thread starts, which create a clearance between the imprints and the threads. This clearance will facilitate engagement of the skirt on the threads during rescrewing. Naturally, this clearance decreases as the rescrewing takes place and disappears at the end of the rescrewing. The interleaving of the threads in the imprints can be likened to a cone-in-cone contact, given that the threads and the imprints both have a "conical" or "tapered" configuration, if their helical curvature is ignored. The rescrewing therefore requires an increasing torque, which gives the user a justified feeling of sufficiency and quality.

It should be observed that this particular configuration of the threads of the neck finds a very particular advantage with the dispenser of document WO 2009/150351. Indeed, it is the "conical" or "tapered" configuration of the threads that provides the same negative configuration to the imprints of the skirt, which makes it possible to create this advantageous clearance between the imprints and the threads at the beginning of rescrewing.

Advantageously, at least half of the length of the intermediate portion has a cross-section which decreases in the unscrewing direction and increases in the screwing direction, such that the unscrewing torque decreases and the rescrewing torque increases. On the other hand, the helical thread, at the junction between the lower thread end and the intermediate portion, may present a maximum cross-section. According to an embodiment, the intermediate portion may include a constant maximum cross-section lower part (12MC). This means that the cross-section does not necessarily increase over the entire length of the intermediate portion. A constant end section range may be used to indicate to the user that rescrewing is sufficient.

Advantageously, the intermediate portion presents an axial height and a radial thickness, at least one of these two sizes decreases in the unscrewing direction and increases in the screwing direction. It is therefore possible to act on these two sizes, or only on one, in order to vary the cross-section of the thread(s). By way of indication, the axial height may vary by at least 20%, advantageously between 1 mm and 1.5 mm. Alternatively or cumulatively, the radial thickness may vary by at least 30% and preferably by 50%, advantageously between 0.4 mm and 0.6 mm. The ratio of the axial height to the radial thickness may be of the order of 2 to 3.

According to an advantageous embodiment, the neck comprises at least two helical threads, advantageously three or four. The docking of the skirt on the neck is all the more stable the greater the number of threads, since the number of bearing points is multiplied.

According to another interesting characteristic, the helical threads may overlap.

Advantageously, said at least one helical thread includes two inclined lateral flanks and a substantially flat and cylindrical top, such that the helical thread presents a cross-section of generally short configuration. This increases the stiffness of the threads, which will have to withstand various uncalibrated torques, since they are exerted by the users.

According to an advantageous practical embodiment, the skirt is made of a plastic material and the helical threads are made of glass, the skirt comprising flexible tabs separated by slots, each flexible tab being internally provided with at least one bead intended to be deformed by the helical thread of the neck, the beads being elongate and extending transversely to the helical thread.

The spirit of the present invention resides in the tapered shape over a significant part of the length of the neck threads, which makes it possible to produce corresponding imprints, which enables to create a clearance at the start of rescrewing which is used to advantage for starting the rescrewing easily without trial.

The invention will now be described in more detail with reference to the accompanying drawings, which show several embodiments of the invention as non-limiting examples.

In the figures:

FIG. 5 is a lateral plan view of a threaded neck of the invention;

FIG. 6 is a vertical cross-sectional view through the threaded neck of FIG. 5;

FIGS. 7a and 7b are larger-scale views of surrounded details A and B of FIG. 6,

Figure 1:
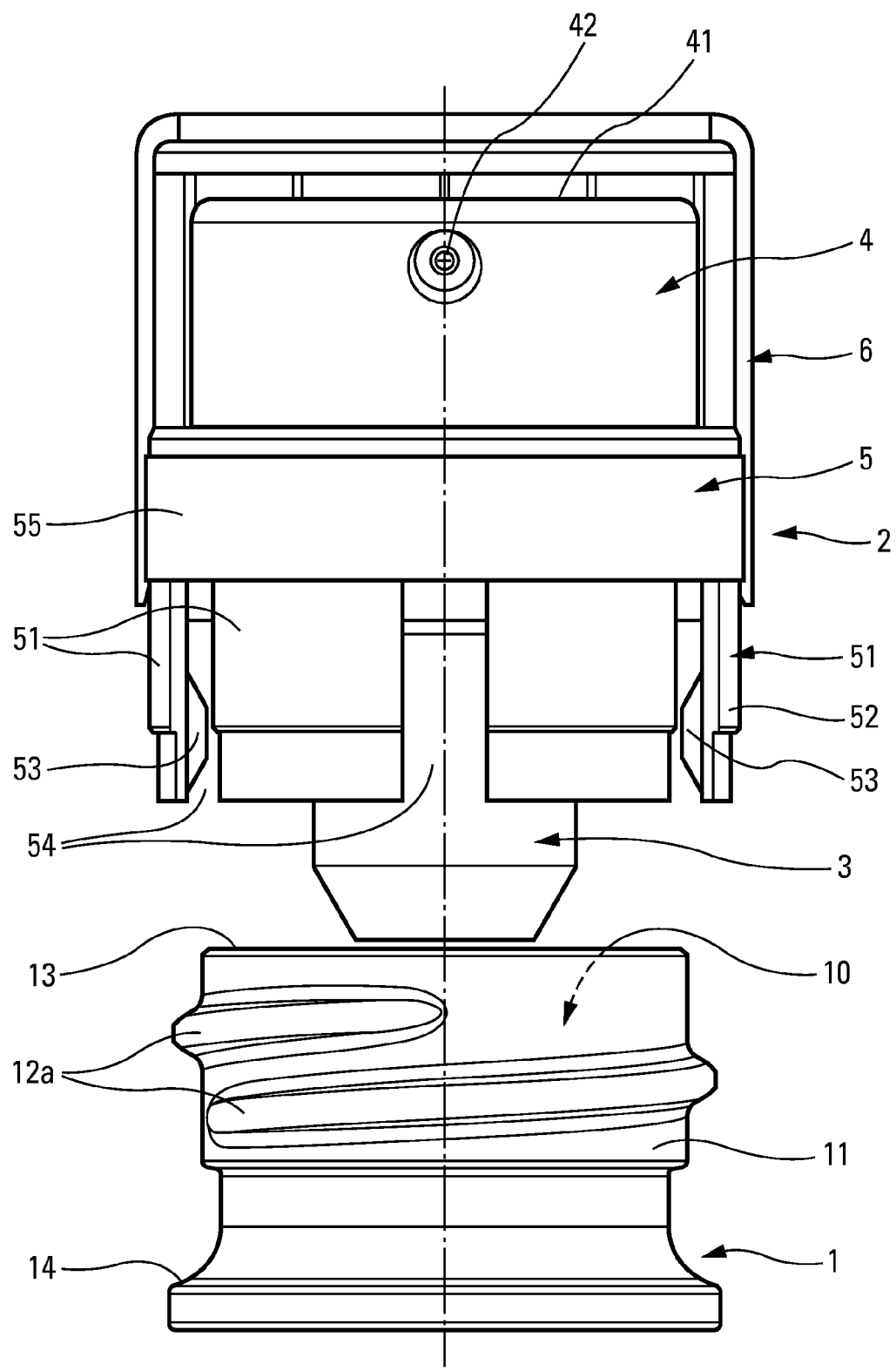
FIGS. 1 to 4 are views showing a fluid product dispenser of document WO 2009/150351, during various successive mounting and removal steps.

The fluid product dispenser shown in the FIGS. 1 to 4 in order to illustrate the prior art corresponding to document WO 2009/150351 comprises two distinct parts or sub-assemblies, namely a fluid product vessel 1 and a dispensing head 2 for mounting on the vessel so as to co-operate with each other to constitute the dispenser.

The fluid product vessel 1 is shown in part only in the FIGS. 1 to 4. Only the neck 11 and a portion of the shoulder 14 of the vessel 1 are shown in the figures. The neck 11 projects axially upwards from the shoulder 14 that already forms a portion of the vessel body (not shown). The neck 11 internally defines an opening 10 that puts the inside of the vessel into communication with the outside. The opening 10 is defined by an annular top edge 13 of the neck 11. Externally, the neck 11 forms one or more helical threads 12a that are in the form of one or more projecting ribs disposed in helical manner. The threads 12a can extend over all or part of the periphery of the neck 11. The threads 12a may be continuous, or, on the contrary, they may be interrupted. The purpose of the threads 12a is to enable a turning movement to be combined conventionally with an axial movement. This may be referred to as screwing/unscrewing movement. The vessel 1 can be made of any material that makes it possible to obtain a neck that is rigid and not deformable. In particular, the vessel may be made of glass, of metal, or even of a rigid plastic material.

The dispensing head 2 essentially comprises three component members, namely: a dispensing member 3 that can be a pump or a valve; a pusher 4 that is mounted on the dispensing member 3 so as to actuate it; and a fastening member 5.6 engaging both with the threaded neck 11 of the vessel and the dispensing member 3. Reference is made below to all of the figures while describing the structure of the dispensing head 2.

The dispensing member 3 includes a body 30 that defines, at one of its ends, an inlet 31 for the fluid product coming from the vessel. The body 30 forms a fastening rim 37 that projects radially outwards. The dispensing member 3 also includes an actuation rod 32 that projects upwards, out from the body 30, and that is axially movable down and up relative to the body. A return spring 33 urges the actuation rod 32 into the position in which it is extended to its maximum out from the body. The actuation rod 32 internally defines a flow channel for the fluid product put under pressure inside the body 30. This design is entirely conventional for a pump or a valve in the fields of perfumery, cosmetics, and even pharmacy. Given that the internal structure of the dispensing member 3 is not critical for the present invention, it is not described in greater detail below.

The pusher 4 is mounted on the free end of the actuation rod 32 of the dispensing member 3. The fluid coming from the actuation rod 32 is conveyed via an internal channel to the dispensing orifice 42 formed by the pusher. In addition, the pusher includes a bearing surface 41 on which the user can press using one or more fingers so as to move the pusher 4 axially down and up. In this way, fluid product is dispensed through the dispensing orifice 42, optionally in metered manner. Here again, this design is entirely conventional for a fluid product dispenser.

The fastening member comprises two distinct component elements, namely a fastening ring 5 and a blocking collar 6. The collar 6 is engaged around the ring 5 in such a manner as to mask all or part of it. One purpose of the collar 6 is to deform the ring 5 radially inwards and to hold it in that state.

The ring 5 is advantageously made of a plastic material that is deformable and malleable making it possible to create both zones that deform easily, and other zones that are more rigid. The ring 5 presents an overall configuration that is substantially circularly cylindrical about the axis of the dispenser. The ring 5 is preferably made as a single piece, but it is possible to distinguish three portions, each performing a distinct function.

Figure 2:
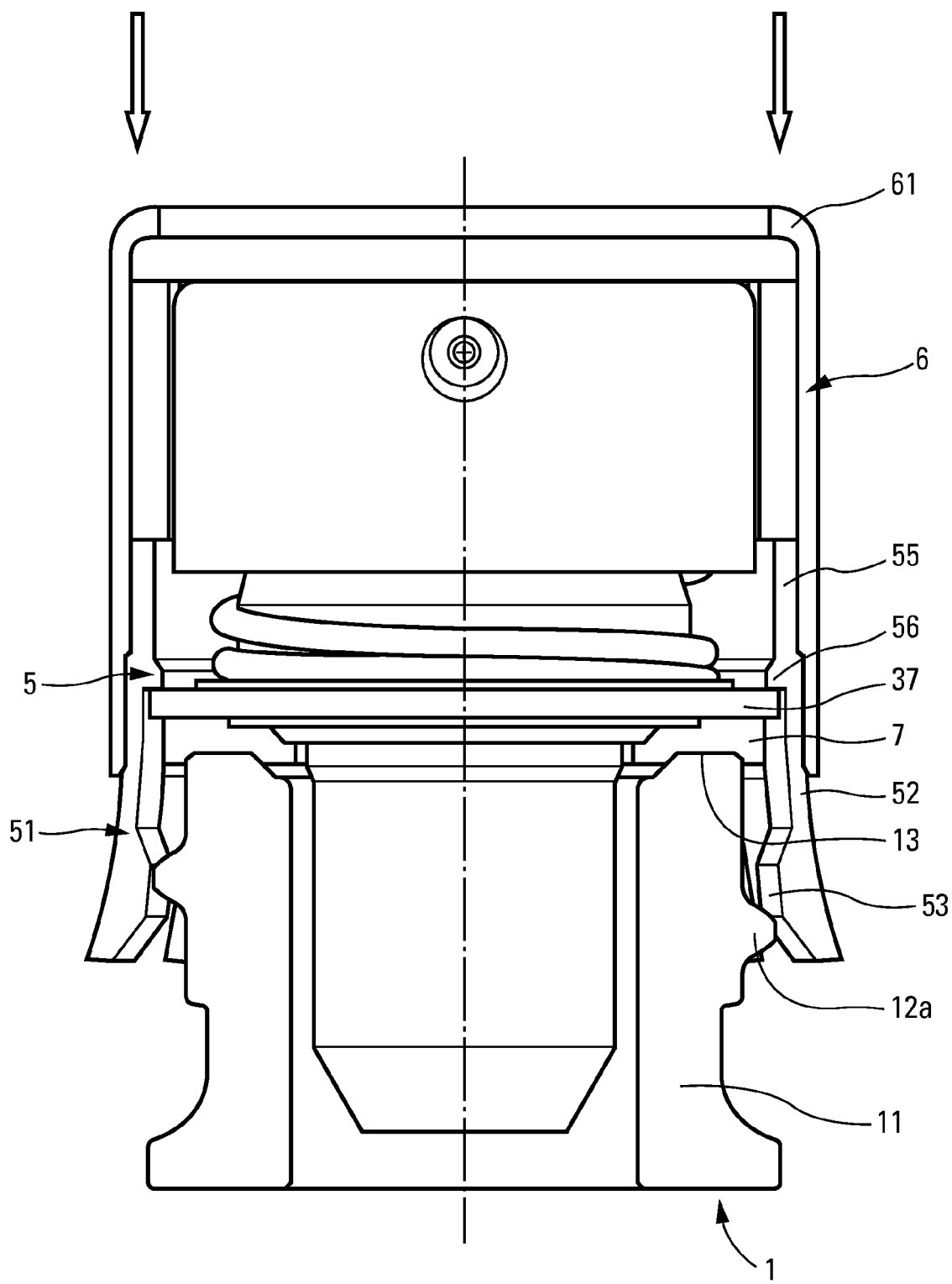
Figure 3:
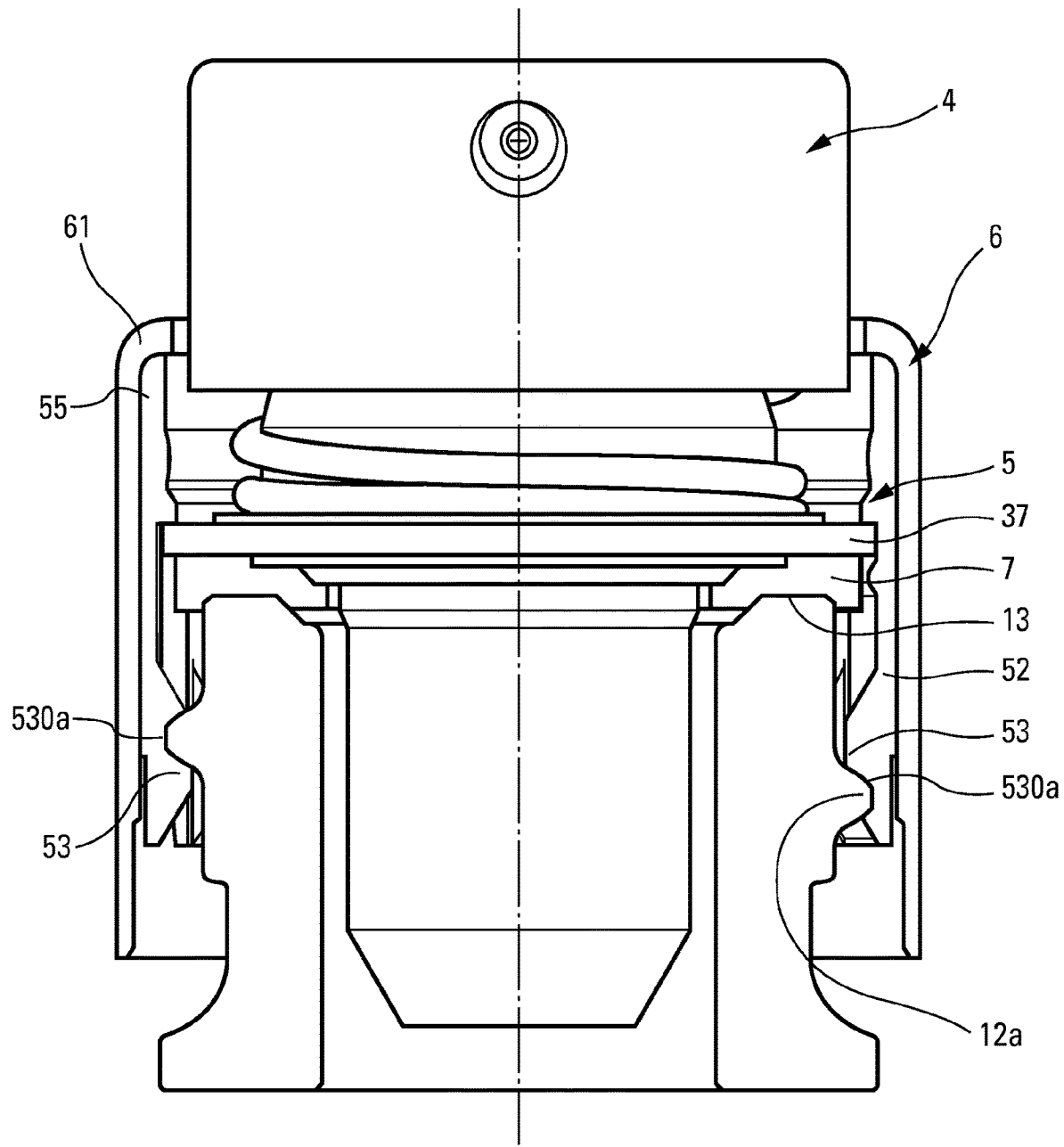
Figure 4:
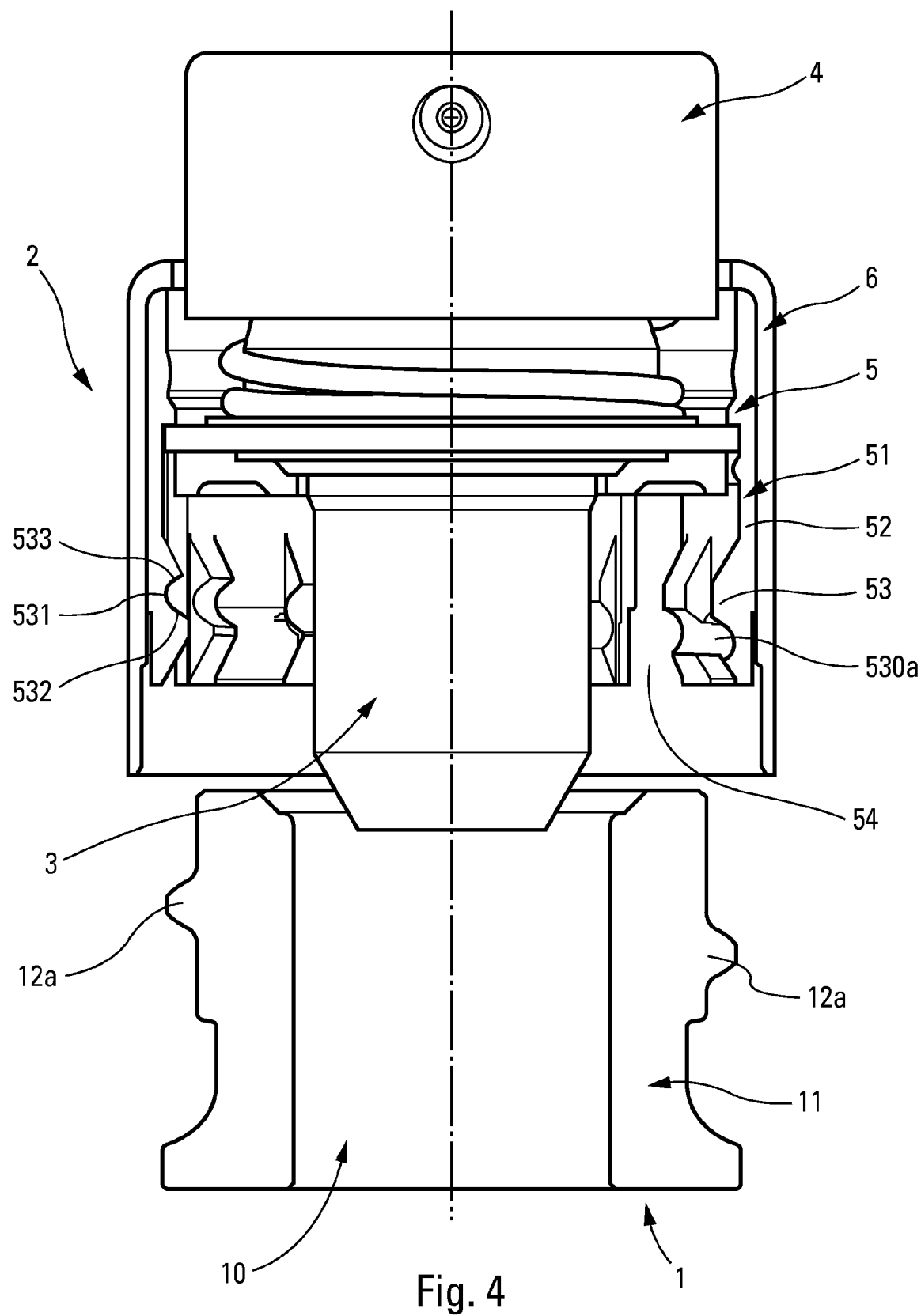

The ring thus includes a skirt 51 intended to engage about the threaded neck 11 of the vessel. Consequently, in the mounted position, the skirt 51 extends around the neck 11 down to below threads 12a, as shown in FIGS. 4 and 5. The skirt 51 may be continuous over its entire periphery in such a manner as to form a complete cylinder. In a preferred variant, as shown in the figures, the skirt 51 forms flexible tabs 52 that are separated by radial slots 54. This can clearly be seen in FIG. 1. The number of tabs 52 can lie in the range three to more than ten. In the figures, the skirt 51 forms six flexible tabs 52 that are separated by six radial slots 54. The slots 54 can extend over all or part of the height of the skirt 51. In other words, a portion of the skirt can remain continuous, while another portion that is lower down is slotted to form the tabs. In the figures, the skirt 51 is slotted over its entire height. As a result of the skirt 51 being slotted, the tabs 52 present great flexibility, in particular in the radial direction. It can thus be deformed freely outwards and inwards without risk of damaging the tabs. The inside walls of the tabs (or of the skirt) can be completely smooth, or, on the contrary, in a preferred variant, the tabs are formed with beads 53 that project radially inwards. The beads 53 are situated in the proximity of the free bottom end of the tabs 52. The beads 53 are preferably thin and elongate in the axial direction. They are thus in the form of separate small vertical splines or bars. The beads 53 may present beveled leading edges so as to make it easier to put the ring into place on the neck of the vessel. By way of example, it is possible to provide two or three beads per tab. It can also be envisaged to provide only a single bead per tab, which bead extends over all or part of the radial width of the tab. In the figures, there are two beads per tab and six tabs, making a total of twelve beads for the skirt 51. The beads 53 are disposed on the skirt 51 in such a manner as to come to be positioned on the threads 12a, as can be seen in FIGS. 2 to 5. The beads 53 are for being plastically deformed against the threads 12a of the neck 11, as described below.

In addition to the skirt 51, the ring 5 also forms a guide and preassembly bushing 55 that extends upwards in register with the skirt 51. The bushing 55 presents a configuration that is substantially cylindrical, with a diameter that is appropriate for receiving the collar 6, as described below.

At the junction between the bushing 55 and the skirt 51, the ring 5 forms a bearing flange 56 that projects radially inwards. This flange 56, that can be continuous over the entire periphery, or, on the contrary, that can be interrupted, is intended to engage with the rim 37 of the body 30 of the dispensing member 3, so as to push it towards the top edge 13 of the neck 11, with a neck gasket 7 possibly being interposed therebetween. Thrusting the flange 56 against the collar 37 thus causes the neck gasket 7 to be compressed against the annular edge 13 of the neck 11. Good sealing is thus provided between the dispensing member 3 and the neck 11. The compressed state of the gasket 7 is provided solely by the press used to mount the dispensing head, and not by the deformation of the skirt 51, as occurs with prior-art fastening members.

The blocking collar 6 may be a visible collar that is attractive, or, on the contrary, it may be an internal collar that is not visible. In the figures, the collar 6 is a visible covering collar that may be made of metal, for example. The collar 6 is generally cylindrical with an inwardly-directed top flap 61 for coming into abutment against the free top end of the bushing 55. The inside diameter of the collar 6 is slightly smaller than or equal to the outside diameter of the ring 5. The collar 6 thus constrains and holds the ring 5 in a substantially-cylindrical and blocked configuration.

Reference is made below consecutively and in order to the various figures, so as to describe a cycle for mounting a dispensing head on a threaded vessel-neck and for removing it therefrom. In FIG. 1, the dispensing head 2 is not yet in engagement with the neck 11. The tabs 52 of the skirt 51 thus extend in completely cylindrical manner, without being subject to any deformation. The collar 6 is pre-engaged around the ring 5 at the bushing 55. The ring 5 and the collar 6 thus constitute a single sub-unit that is inseparable, and that is therefore held captive. In addition, the bushing 55 makes it possible to hold and to guide the collar 6 accurately axially. It should be observed that the collar 6 is not yet engaged around the skirt 51. The first mounting step consists in engaging the skirt 51 around the threaded neck 11. This is shown in FIG. 2. The dispensing member 3 thus being engaged inside the opening 10 of the neck. The gasket 7 disposed under the collar 37 is thus in contact with the top edge 13 of the neck 11. The beads 53 formed at the tabs 52 are disposed on the threads 12a. It should be observed that the tabs 52 are slightly deformed outwards, as a result of the beads 53 coming into contact with the threads 12a. The beads 53 are not yet deformed against the threads 12a. The third mounting step consists in lowering the collar 6 around the ring 5. This is performed by exerting pressure on the inwardly-directed flap 61 of the collar 6. The pressure makes it possible to flatten the neck gasket 7 so as to provide sealing. The collar 6 thus begins to be engaged around the skirt 51. The beads 53 begin to be pressed hard against the threads 12a. The operation of lowering or engaging the collar 6 around the ring 5 continues until the collar 6 surrounds the ring 5 completely, as shown in FIG. 3. This corresponds to the final mounted position in which the beads 53 of the tabs 52 are deformed against the threads 12a in such a manner as to create thread imprints 530a in the material constituting the beads 53. In this final mounted position, the inwardly-directed flap 61 is in abutment against the top end of the bushing 55. It is also possible to determine the final mounted position when the bottom end of the collar 6 comes into abutment contact with the shoulder of the vessel. To do this, it suffices to provide a collar that is slightly taller. As a result of the threads 12a extending in helical manner, the thread imprints 530a are formed at different axial levels on the various beads 53. For example, in FIG. 3, the thread 12a in the right-hand portion forms an imprint 530a that is in the proximity of the bottom end of the bead 53, whereas in the left-hand portion, the imprint 530a is formed towards the top of the bead 53. The threads advantageously come into contact with the skirt 51 only at the beads 53. Thus, contact between the skirt and the neck occupies only part of the periphery, and preferably extends over less than half the periphery of the neck. This applies when there are only twelve beads 53 distributed around the periphery. This interrupted contact makes it possible to reduce the friction forces between the skirt and the neck considerably, thereby making it possible to loosen the dispensing head manually. The torque is applied directly on the collar 6 that is in clamping contact with the ring 5. Contact between the collar and the ring extends over the entire periphery and advantageously over almost the entire height of the ring. The friction between the ring and the collar is therefore considerably greater than the friction between the beads 53 and the threads 12a. Loosening is thus made possible. Once the loosening operation has been completed, the dispenser is in the configuration shown in FIG. 4. The thread imprints 530a that have been created in the beads 53 can thus clearly be seen. Each imprint 530a comprises an imprint bottom wall 531 that is bordered by two opposite imprint flanks 532 and 533. This demonstrates that the thread imprints 530a are formed without generating traction on the tabs 52. In other words, the inwardly-directed radial thrust created by the collar 6 is not transformed into thrust with an axial component while the beads 53 are making contact with the threads 12a. The compression of the neck gasket 7 is thus obtained and controlled entirely by the force exerted by the mounting press. Such imprints 530a can be obtained merely as a result of the beads extending on either side of the threads 12a. There is therefore no cam effect or force-direction transformation effect while the beads 53 are being deformed. The deformation of the beads 53 is plastic deformation by instantaneous and/or subsequent movement of material, in particular by creep. It is known that plastics materials tend to creep over time in order to achieve a final deformed state. In the context of the present invention, the creep phenomenon is used to advantage, given that a relatively lengthy period of time passes between the dispenser being mounted and the dispensing head being loosened when the vessel is empty. Once the dispensing head has been loosened, the thread imprints 530 remain in this state so as to form a permanent complementary thread. The plastic material constituting the beads 51 does not deform back again by shape memory, given that the material has been subject to creep over a lengthy period.

By means of the fastening member of document WO 2009/150351, it is possible to fasten a dispensing head on a vessel with a threaded neck without performing a screwing operation, while making it possible to unscrewing the head so as to enable the dispenser to be recycled by separating the vessel from its dispensing head.

The rescrewing of the dispensing head onto the threaded neck was not a purpose of document WO 2009/150351: it was sufficient for the head to be able to be removed by unscrewing. Rescrewing is a new requirement that meets the objectives of durability, since it allows the user to fill the vessel and replace the dispensing head. It has been found that the rescrewing is not possible with the fastening member and the threaded neck of document WO 2009/150351, because the thread imprints 530a formed by the threaded neck in the skirt 51 are in "too" intimate contact with the threads 12a of the neck.

The present invention provides an enhancement or improvement to the device of the document WO 2009/150351, which is intended to allow easy rescrewing, but also to facilitate unscrewing, without, however, changing anything in the method of assembly and in the fastening member of the document WO 2009/150351. The modification only relates to the threads 12a of the threaded neck 11: this implies that the ring of the invention is identical to that of the document WO 2009/150351, except concerning the thread imprints which are created by the thread of the neck. While the threads 12a of document WO 2009/150351 are constant over their entire length, that is to say that their vertical cross-section is unchanged over their length, the threads 12 of the invention have a cross-section which decreases in the unscrewing direction or increases in the screwing direction, so that the unscrewing torque decreases and the rescrewing torque increases. This can already be seen in FIGS. 5 and 6, where it can be seen that the threads are "thinner" or "narrower" as they approach the upper annular edge 13. Conversely, it can be said that the threads 12 are "larger" or "wider" as they approach the shoulder 14. It can also be said that the threads 12 taper or thin from the bottom upwards, or from the shoulder 14 towards the upper annular edge 13. Their cross section decreases upwards. This reduction in section may be due to a reduction in their axial height and/or in their radial thickness. This reduction may be continuous over the entire length of the threads. It could also be discontinuous and have segments or portions of thread of constant cross-section. But overall, it can be said that the threads 12 reduce in the unscrewing direction or increase in the screwing direction.

In the embodiment in FIGS. 5 and 6, the neck 11 comprises two threads 12 which extend substantially over a little more than half of the periphery of the neck: it can be seen that they overlap each other over a short distance. Each thread 12 defines an upper thread start 12m located in the proximity of the edge 13 and a lower thread end 12M located in the proximity of the shoulder 14. The start 12m and the end 12M can be defined as the end portions of the thread 12 whose cross section increases/decreases rapidly. The thread start 12m has a minimum cross-section and the thread end 12M has a maximum cross-section. Between these two points, the thread 12 forms an intermediate portion 12i of increasing cross-section, going from the thread start 12m towards the thread end 12M. The length of the intermediate portion 12i is much greater than the length of the start 12m or the end 12M. In this embodiment, the variation in cross-section is constant and progressive over the entire length of the intermediate portion 12i. Thus, the helical thread 12, at the junction between the bottom thread end 12M and the intermediate portion 12i, has a maximum cross-section.

In FIG. 7a, it can be seen that the thread start 12m defines an axial height Hmin and a radial thickness Emin with respect to the remainder of the neck 11 which is generally cylindrical. The thread start 12m has a substantially trapezoidal shape, with two inclined lateral flanks 121m and 123m and a substantially flat and cylindrical top 122m, such that the helical thread 12 has a cross-section of generally short configuration. As a purely indicative example, Hmin may be about 1.2 mm and Emin may be from about 0.3 mm to 0.5 mm.

FIG. 7b shows that the thread end 12M defines an axial height Hmax and a radial thickness Emax. The thread end 12M also has a substantially trapezoidal shape, with two inclined lateral flanks 121M and 123M, and a substantially flat and cylindrical top 122M, such that the helical thread 12 also has a cross-section of generally short configuration. By way of indication, Hmax may be about 1.5 mm and Emax may be 0.2 mm greater than Emin, i.e., between 0.5 and 0.7 mm.

Thus, the axial height may vary by at least 20%, and the radial thickness may vary by at least 30%, and preferably by 50%.

Figure 8A:
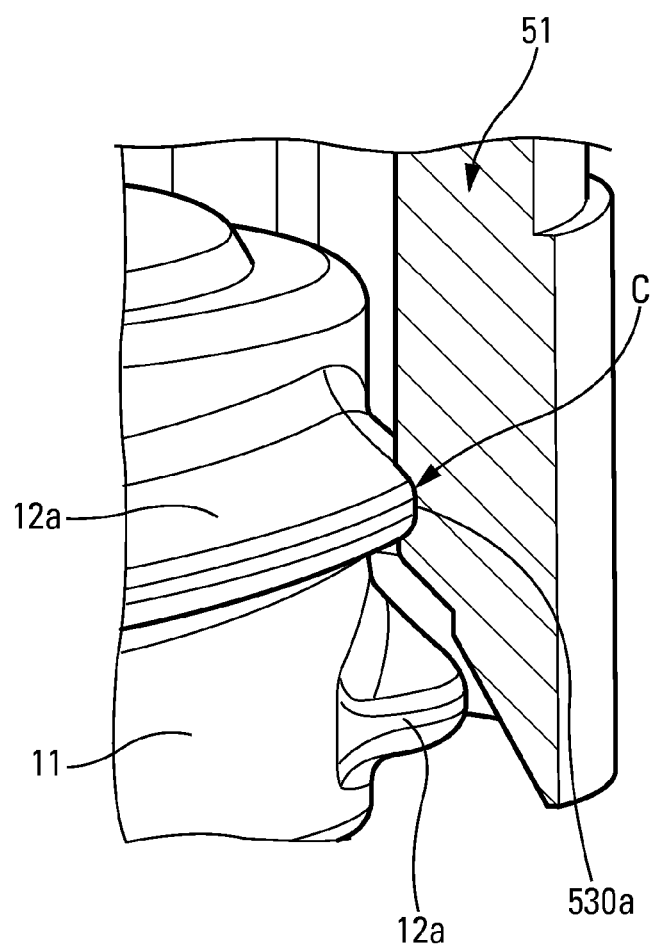
FIGS. 8a and 8b are perspective views showing the engagement of the skirt with the threaded neck respectively in the context of document WO 2009/150351 and the present invention, and FIGS. 9a, 9b and 9c respectively illustrate three other embodiments for neck threads of the invention.

FIG. 8a is in the context of document WO 2009/150351, with constant threads 12a and corresponding thread imprints 530a. During the rescrewing, the imprints 530a will come directly into intimate and pressed contact C with the threads 12a: it can even be said that the skirt 51 will come into abutment against the threads 12a and make the initiation of the rescrewing almost impossible. In practice, it is very laborious, or even impossible, to achieve the engagement of the threads 12a in the imprints 530a. After several unsuccessful attempts, most users give up rescrewing the dispensing head onto the threaded neck.

Figure 8B:
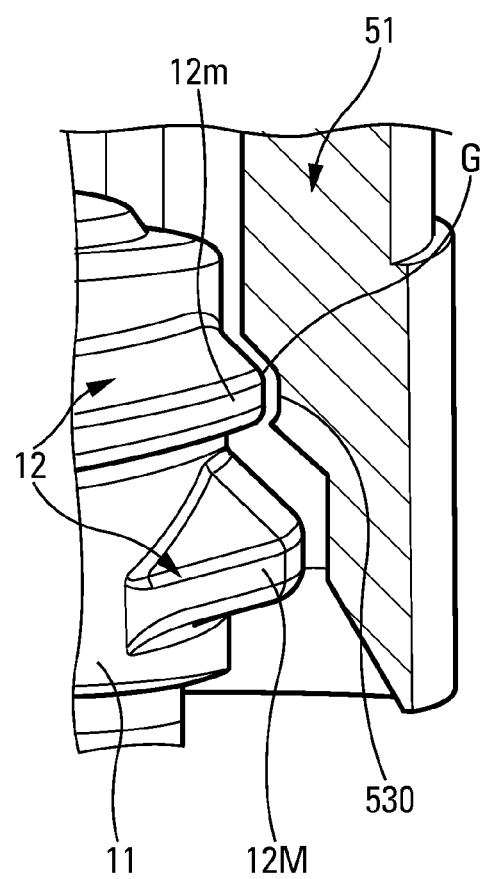

FIG. 8b shows the context of the invention, with increasing threads 12 and corresponding thread imprints 530. During rescrewing, the imprints 530 will engage easily around the threads 12a because of the clearance G existing between them: this clearance G results from the fact that the imprints 530 of maximum section engage around the thread starts 12m of minimum section. In practice, it is very easy to achieve the engagement of the threads 12 in the imprints 530 of the skirt 51. The screwing torque is then almost zero, but it will increase progressively as the rescrewing takes place. At the end of rescrewing, the torque will be maximum, since the imprints 530 will come into intimate contact with the threads 12 which have formed them. The mutual engagement of the threads 12 in the imprints 530 may be similar to a cone-in-cone contact, given that they are both conical or tapered.

Figure 9A:
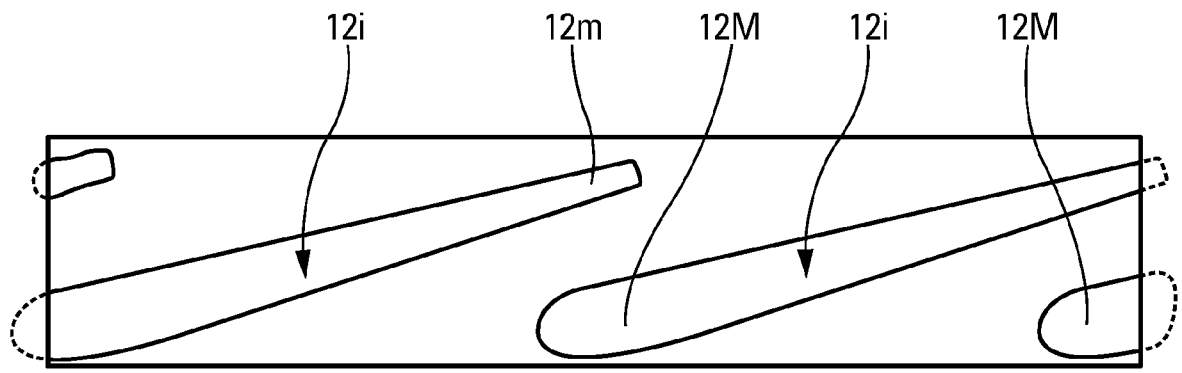
Figure 9B:
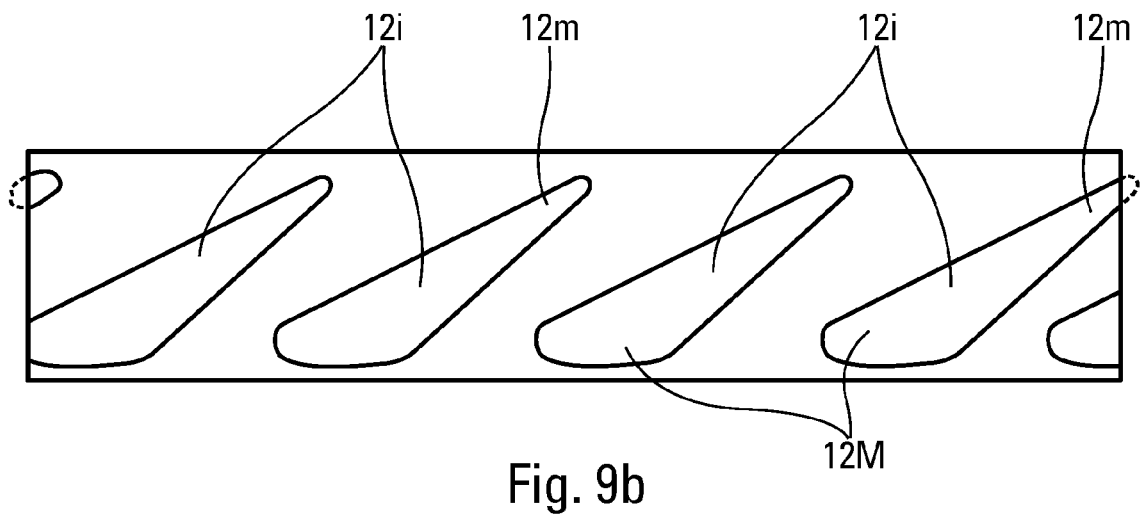
Figure 9C:
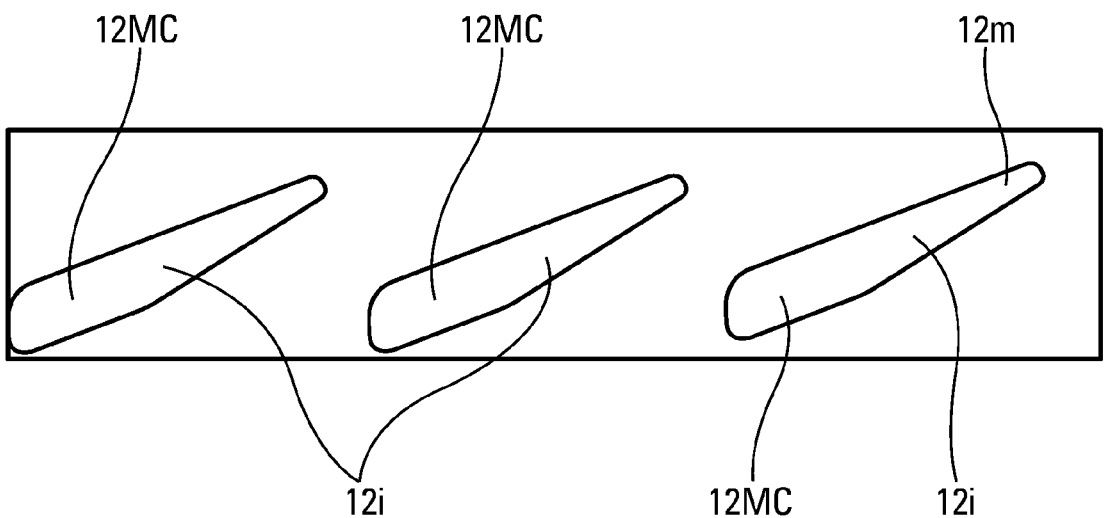

FIGS. 9a, 9b and 9c illustrate different necks that have been unrolled flat to see all of the threads 12.

The neck 11 of FIG. 9a comprises three threads 12 which overlap a little. Each thread defines a thread start 12m of reduced section and a thread end 12M of increased section. The variation in section of the intermediate portion 12i is constant, continuous and progressive over its entire length.

The neck 11 of FIG. 9b comprises four threads 12 which overlap a little. Each thread defines a thread start 12m of reduced section and a thread end 12M of increased section. The variation in section of the intermediate portion 12i is constant, continuous and progressive over its entire length.

The neck 11 of FIG. 9c comprises three threads 12 which do not overlap. Each thread defines a thread start 12m of reduced section and a thread end 12M of increased section. The variation in section of the intermediate portion 12i is constant, continuous and progressive up to a constant section portion 12MC, the end of which defines the thread end 12M.

Thus, it can be said that the intermediate portion 12i has, over at least part of its length, a cross-section which decreases in the unscrewing direction and increases in the screwing direction, so that the unscrewing torque decreases and the rescrewing torque increases.

Although several threads are preferred, it is still possible to produce a neck of the invention with a single thread.

By means of the invention defining neck threads of increasing section in the screwing direction, a dispensing head that has been previously unscrewed and that was initially mounted on the threaded neck by radial clamping to form the thread imprints can easily be rescrewed. The invention, from a structural point of view, relates essentially to the configuration of the threads of the neck, and consequently to the vessel, but the advantages induced by this particular configuration of the neck threads are manifested essentially relative to the cooperation between this threaded neck and the skirt, which allows not only the initial axial assembly and the disassembly by unscrewing, but above all an easy and effective reassembly by rescrewing. Although the vessel is the essential structural means, it is the dispensing head which makes it possible to carry out the invention in association with the vessel.

The invention claimed is:

1. A fluid product dispenser comprising:
   a fluid product vessel provided with an externally threaded neck and internally defining an opening communicating with the inside of the vessel, the neck forming at least one helical thread, which comprises an upper thread start, a lower thread end and an intermediate portion,
   a dispensing head mounted on the neck of the vessel, the head comprising a dispensing member; a pusher for actuating the dispensing member; and a fastening member engaged both with the threaded neck of the vessel and with the dispensing member, the fastening member comprising:
   a deformable and malleable skirt intended to engage with the threaded neck; and
   a rigid collar that is engaged around the skirt so as to push the skirt radially against the threaded neck in such a manner as to deform the skirt against the thread so as to create a thread imprint in the skirt,
   wherein the intermediate portion has, over at least part of a length of the intermediate portion, a cross-section which decreases in the unscrewing direction and increases in the screwing direction, so that the unscrewing torque decreases and the rescrewing torque increases.

2. The dispenser according to claim 1, wherein at least half of the length of the intermediate portion has a cross-section which decreases in the unscrewing direction and increases in the screwing direction, such that the unscrewing torque decreases and the rescrewing torque increases.

3. The dispenser according to claim 1, wherein the at least one helical thread, at the junction between the lower thread end and the intermediate portion, has a maximum cross-section.

4. The dispenser according to claim 1, wherein the intermediate portion includes a bottom portion of constant maximum cross-section.

5. The dispenser according to claim 1, wherein the intermediate portion has an axial height and a radial thickness, at least one of these two sizes decreases in the unscrewing direction and increases in the screwing direction.

6. The dispenser according to claim 5, wherein the axial height varies by at least 20%.

7. The dispenser according to claim 5, wherein the radial thickness varies by at least 30%.

8. The dispenser according to claim 5, wherein the ratio of axial height to radial thickness is of the order of 2 to 3.

9. The dispenser according to claim 5, wherein the axial height varies between 1 mm and 1.5 mm.

10. The dispenser according to claim 5, wherein the radial thickness varies between 0.4 mm and 0.6 mm.

11. The dispenser according to claim 5, wherein the radial thickness varies by at least 50%.

12. The dispenser according to claim 1, wherein the neck (C) comprises at least two helical threads (T).

13. The dispenser according to claim 12, wherein the at least two helical threads overlap.

14. The dispenser according to claim 1, wherein said at least one helical thread comprises two inclined lateral flanks and a substantially flat and cylindrical top, such that the at least one helical thread has a cross-section of short configuration.

15. The dispenser according to claim 1, wherein the skirt is made of a plastic material and the at last one helical thread is made of glass, the skirt including flexible tabs that are separated by slots, each flexible tab being provided internally with at least one bead intended to be deformed by the at least one helical thread of the neck, the at least one bead being elongate and extending transversely to the at least one helical thread.

16. The dispenser according to claim 1, wherein the fluid product vessel is made of glass.

17. The dispenser according to claim 1, wherein the neck comprises three or four helical threads.

18. The dispenser according to claim 1, wherein the dispenser member is a pump or a valve.

* * * * *